United States Patent [19]

Yamauchi

[11] Patent Number: 5,045,737
[45] Date of Patent: Sep. 3, 1991

[54] STARTER MOTOR

[75] Inventor: Hayato Yamauchi, Hyogo, Japan

[73] Assignee: Mitsubishi Denki Kabushiki Kaisha, Tokyo, Japan

[21] Appl. No.: 545,738

[22] Filed: Jun. 29, 1990

[30] Foreign Application Priority Data

Jun. 30, 1989 [JP] Japan .................. 1-77997

[51] Int. Cl.[5] .................. H02K 5/04; H02K 7/10
[52] U.S. Cl. ........................... 310/89; 74/7 A; 74/7 R; 310/91; 310/93
[58] Field of Search ............... 74/7 A, 7 R; 310/89, 310/91, 83, 42, 239, 268

[56] References Cited

U.S. PATENT DOCUMENTS

| 3,209,603 | 10/1965 | Rodriguez | 74/7 A |
|---|---|---|---|
| 3,759,019 | 10/1973 | Wells | 310/91 X |
| 4,304,140 | 12/1981 | Ebihara | 74/7 A X |
| 4,384,224 | 5/1983 | Spitler | 310/89 X |
| 4,553,442 | 11/1985 | Mazzorana | 74/7 R X |
| 4,573,364 | 3/1986 | Givan | 310/83 X |
| 4,673,838 | 6/1987 | Takagi et al. | 310/89 X |
| 4,677,335 | 6/1987 | Ueda et al. | 310/89 X |
| 4,779,470 | 10/1988 | Morita et al. | 74/7 R |
| 4,808,836 | 2/1989 | Isozumi et al. | 290/48 |
| 4,897,571 | 1/1990 | Isozumi | 310/89 X |
| 4,922,149 | 5/1990 | Isozumi et al. | 310/89 |
| 4,931,681 | 6/1990 | Spaggiari | 310/89 |

FOREIGN PATENT DOCUMENTS 1051936  1/1954  France .................. 74/7

Primary Examiner—Allan D. Herrmann
Assistant Examiner—Julie Krolikowski
Attorney, Agent, or Firm—Sughrue, Mion, Zinn, Macpeak and Seas

[57] ABSTRACT

A starter motor wherein a rear bracket 7 can be commonly used for another starter motor having a different position for a through bolt 8 and a planar seat for a through bolt can be assured readily. The starter motor comprises a retaining member 10 which retains an armature rotary shaft in position, a cover 20a mounted on the rear bracket for covering over the retaining member, a plurality of headed through bolts for fastening the rear bracket and a machine frame 4 together to a front bracket 6, and a plurality of supports 20b for engaging with the heads of the through bolts. The cover and the supports are formed in an integral relationship with each other.

3 Claims, 2 Drawing Sheets

STARTER MOTOR

BACKGROUND OF THE INVENTION

1. Field of the Invention

This invention relates to a starter motor, and more particularly to a structure for fixing a through bolt of a starter motor.

2. Description of the Prior Art

A conventional starter motor will be first described with reference to FIGS. 4 and 5. The starter motor shown includes an armature rotary shaft 1, an armature core 2 secured by press fitting to an outer periphery of the armature rotary shaft 1, and a commutator 3 fitted at a portion of the armature rotary shaft 1 rearwardly (leftwardly in FIG. 4) of the armature core 2. A yoke 4 which serves as a machine frame and forms a magnetic circuit of the motor is disposed around the armature core 2, and a field coil 5 is disposed on an inner periphery of the yoke 4. A front bracket 6 is fitted at a front end of the yoke 4 while a rear bracket 7 is fitted at a rear end of the yoke 4, and the yoke 4 and front and rear brackets 6 and 7 are secured in an integral relationship to each other by means of a pair of headed through bolts 8 which extend along outer peripheries of the rear bracket 7 and yoke 4 into the front bracket 6. The rear bracket 7 is formed by stamping an iron plate, and a central portion of a rear end wall of the rear bracket 7 is opened as at 7b and extends forwardly to form a forward extension 7a. A bearing 9 is secured by press fitting in an inner periphery of the forward extension 7a of the rear bracket 7 and supports a rear end portion of the armature rotary shaft 1 for rotation thereon. A retaining member 10 having a diameter greater than the rear end opening 7b of the rear bracket 7 is mounted at the rear end of the armature rotary shaft 1 for engaging with the rear bracket 7 to prevent the armature rotary shaft 1 from coming off axially forwardly. A cover 11 is secured to the rear bracket 7 by means of a pair of screws 12 and covers over the retaining member 10 and the rear end of the armature rotary shaft 1. A pair of brush holders 14 are secured to the rear bracket 7 also by means of the screws 12. The brush holders 14 are disposed on the inner side of the rear bracket 7 and individually hold brushes 13 thereon such that they may slidably contact with the commutator 3. A pair of supports 15 for engaging with the heads of the through bolts 8 are secured in an integral relationship to an outer periphery of the rear end of the rear bracket 7 by welding.

An overrunning clutch 16 is provided forwardly of the armature rotary shaft 1, and a pinion shaft 17 is mounted for movement on the armature rotary shaft 1 and connected to be driven by way of the overrunning clutch 16. The pinion shaft 17 has a pinion 17a formed at a forward end thereof. A lever 18 is supported for pivotal motion on the yoke 4 and is held in engagement at an end thereof with a plunger 19a of an electromagnetic switch 19 and at the other end thereof with a rear portion of the overrunning clutch 16.

In operation, when the electromagnetic switch 19 is energized, the plunger 19a is pulled into the electromagnetic switch 19, whereupon the lever 18 is pivoted by the plunger 19a to move the overrunning clutch 16 forwardly. Consequently, the pinion driving shaft 17 is moved forwardly until the pinion 17a thereon is put into meshing engagement with a ring gear of an internal combustion engine, not shown. Meanwhile, upon energization of the electromagnetic switch 19, the motor is energized to produce a turning force, and rotation of the armature rotary shaft 1 of the motor is transmitted to the pinion driving shaft 17 by way of the overrunning clutch 16 to rotate the pinion 17a to cause the engine to start its operation. After starting of the engine, the electromagnetic switch 19 is deenergized, and then the pinion 17a is moved back to its initial position by a return spring (not shown) provided at a suitable location in the motor.

In the conventional starter motor having such a construction as described above, the supports 15 for engaging with the heads of the through bolt 8 are welded in an integral relationship to the rear bracket 7. Accordingly, in case it is necessary to change the positions of the through bolts 8 in accordance with a mounting layout of the starter motor, also the positions of the supports 15 must be changed. Thus, the conventional starter motor has a drawback that, when the mounting layout is different, the rear bracket 7 cannot be commonly used.

Meanwhile, since seats for the heads of the through bolts 8 are each formed from a rear end face of a support 15 and a rear face of the rear bracket 7, it is important to assure a planar alignment of those faces. However, since the separate members are welded to form those faces thereon, it is difficult to secure the supports 15 and the rear bracket 7 in an appropriate positional relationship. Beside, since the outer peripheral edge of the rear end of the rear bracket 7 has a curved or circular shape, it is necessary to arrange the through bolts 8 such that their heads cannot engage with the curved portion of the rear bracket 7. In this manner, the conventional starter motor has another drawback in that it is difficult to assure a planar alignment of the faces of the rear bracket 7 and supports 15.

SUMMARY OF THE INVENTION

It is an object of the present invention to provide a starter motor wherein a rear bracket can be commonly used for another starter motor having a different position for a through bolt and a planar seat for a through bolt can be readily assured.

In order to attain the object, according to the present invention, there is provided a starter motor which comprises a machine frame, an armature rotary shaft supported for rotation in the armature, a front bracket disposed forwardly of the machine frame, a rear bracket disposed rearwardly of the machine frame, a retaining member mounted at a rear end portion of the armature rotary shaft for engaging with the rear bracket to prevent the armature rotary shaft from coming off axially forwardly, a plurality of headed through bolts extending along outer peripheries of the rear bracket and the machine frame into the front bracket for fastening the rear bracket and the machine frame together to the front bracket, a plurality of supports formed separately from the rear bracket for engaging with the heads of the through bolts, and a cover disposed on the rear end of the rear bracket for covering over the retaining member, the cover being formed in an integral relationship with the supports.

The cover and the supports may be formed in an integral relationship by stamping an iron plate. Each of the supports may include a flat portion which serves as a seat for the head of a corresponding one of the through bolts and a pair of pawl portions extending laterally from the opposite side edges of the flat portion along the outer periphery of the rear bracket.

With the starter motor, since the cover for covering over the retaining member which retains the armature rotary shaft in position and the supports for engaging with the heads of the through bolts are formed in an integral relationship, even if the positions of the through bolts are changed, the positions of the supports can be determined independently of the position of the rear bracket. Consequently, the rear bracket need not be changed, and can be commonly used for another starter motor wherein the positions of such through bolts are different. Further, planar seats for the through bolts can be readily assured. Besides, the supports can be formed without welding or a like process.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENT

Figure 1:
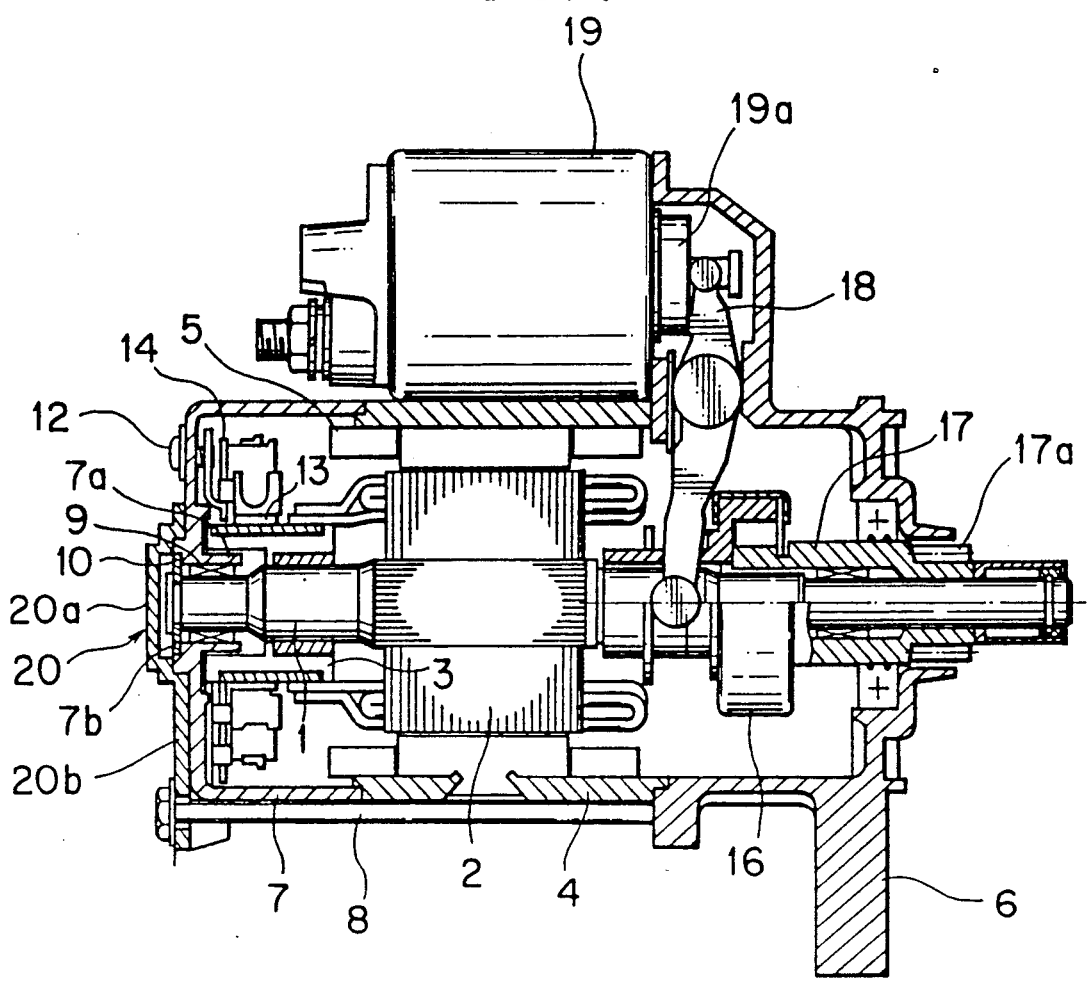
FIG. 1 is an axial sectional view of a starter motor showing a preferred embodiment of the present invention.
Figure 2:
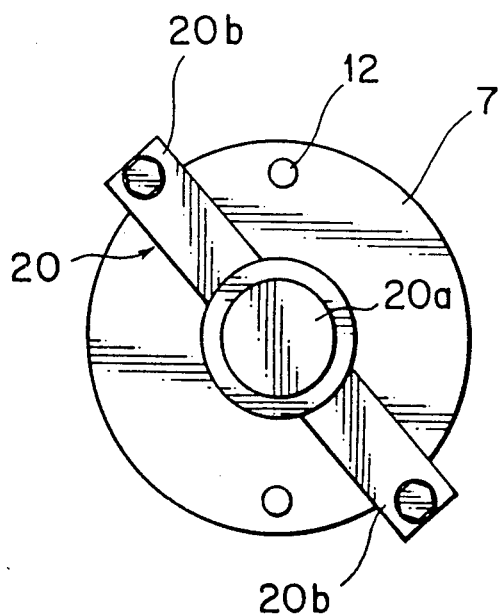
FIG. 2 is a rear elevational view showing a rear bracket of the starter motor of FIG. 1.
Figure 3:
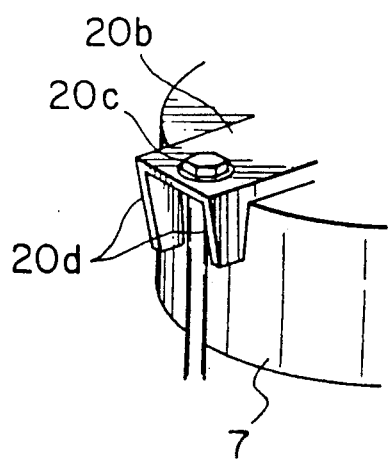
FIG. 3 is a perspective view of part of the starter motor shown in FIG. 1.
Figure 4:
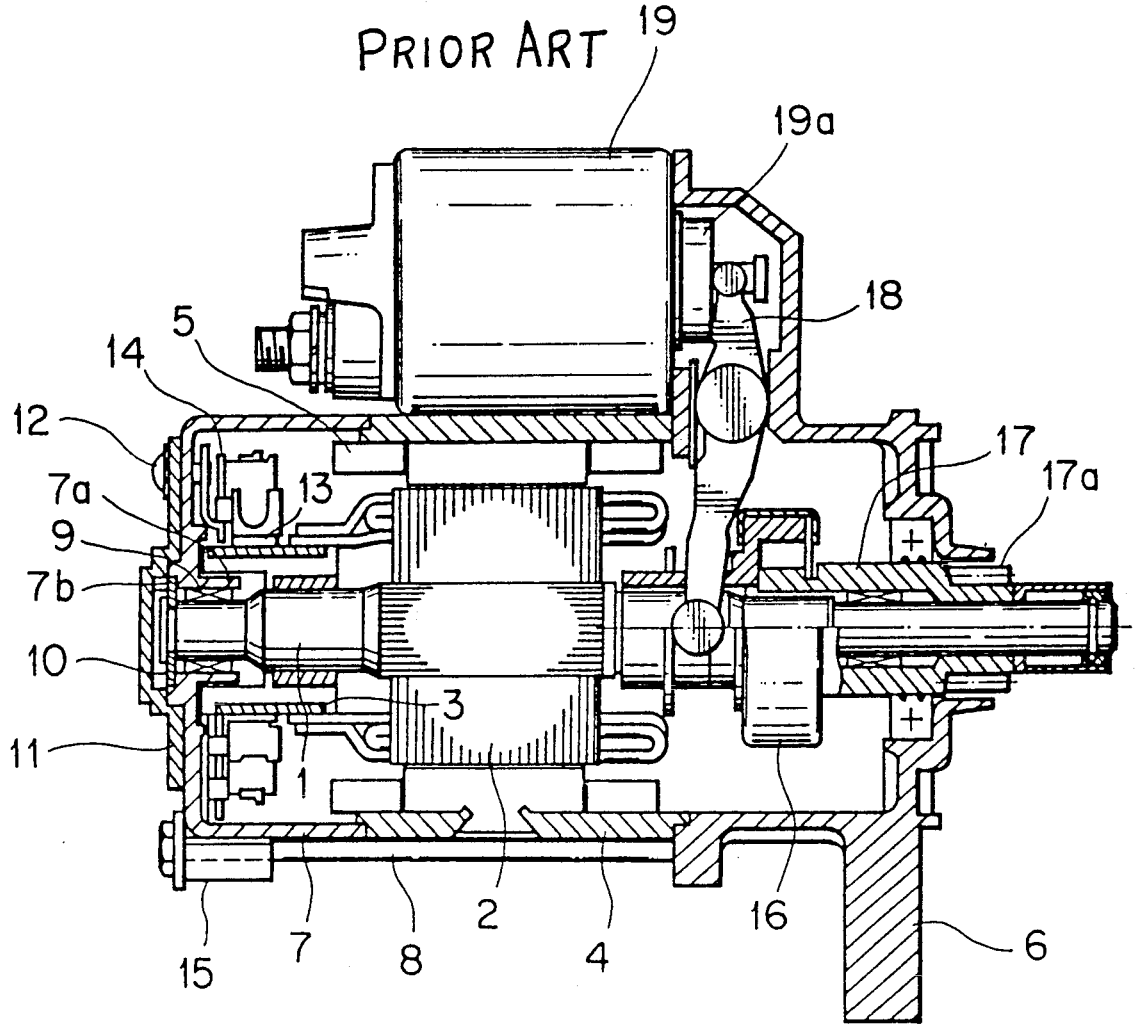
FIG. 4 is an axial sectional view of an exemplary conventional starter motor.
Figure 5:
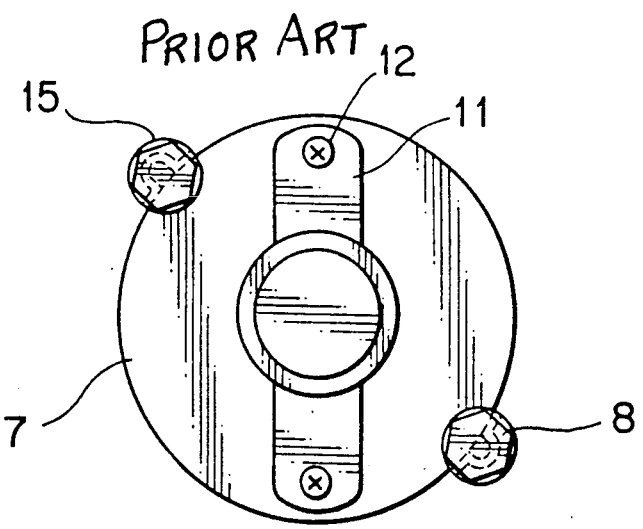
FIG. 5 is a rear elevational view showing a rear bracket of the starter motor of FIG. 4.

Referring to FIGS. 1 to 3, there is shown a starter motor to which the present invention is applied. The starter motor shown has a substantially similar construction to that of the conventional starter motor shown in FIGS. 4 and 5 and described hereinabove except that the cover 11 and the supports 15 of the conventional starter motor are formed in an integral relationship with each other as a fixing member 20. In particular, the fixing member 20 has a cover portion 20a for covering over the opening 7a of the rear bracket 7 and the retaining member 10, and a pair of supporting portions 20b formed in an integral relationship with the cover portion 20a for engaging with the heads of the through bolts 8. It is formed by stamping an iron plate. In particular, the supporting portions 20b are provided at the opposite ends of the fixing member 20 as seen in FIG. 2 and are each formed from a flat portion 20c which serves as a seat for the head of the through bolt 8 and a pair of pawl portions 20d extending laterally from the opposite side edges of the flat portion 20c along an outer periphery of the rear bracket 7 as seen in FIG. 3.

With the starter motor having the construction described above, the heads of the through bolts 8 are normally held in engagment with the support portions 20b of the fixing member 20, and the rear bracket 7, yoke 4 and front bracket 6 are fastened together by means of the through bolts 8 to secure the fixing member 20 to the rear bracket 7.

Here, the mounting position of the fixing member 20 can be set independently of the mounting position of the rear bracket 7. Accordingly, the single rear bracket 7 can be used for different positions of the through bolts 8 and hence is applicable commonly to a starter motor wherein the positions of the through bolts 8 are different. Further, since the flat portions 20c which serve as seats for the through bolts 8 are provided by a single member in the form of a flat plate, the plane of the flat portions 20c can be readily assured and will not cause a bending stress in the through bolts 8.

The starter motor operates to start an engine (not shown) connected thereto in a similar manner as in the conventional starter motor described hereinabove, and details of such starting operation are omitted herein to avoid redundancy.

It is to be noted that, while the fixing member 20 is formed as a stamped article of an iron plate in the embodiment described above, it is not limited to such specific article, but similar effects as in the embodiment described above can be exhibited even where the fixing member 20 is formed, for example, by die casting of aluminum or molding of a resin material or the like. Further, since the rear bracket 7 is not welded as in the conventional starter motor, a resin material or aluminum or the like can be used for the rear bracket 7.

Having now fully described the invention, it will be apparent to one of ordinary skill in the art that many changes and modifications can be made thereto without departing from the spirit and scope of the invention as set forth herein.

What is claimed is:

1. A starter motor, comprising: a machine frame (4), an armature rotary shaft (1) supported for rotation within said machine frame, a front bracket (6) disposed forwardly of said machine frame, a rear bracket (7) disposed rearwardly of said machine frame, a retaining member (10) secured to a rear end portion of said armature rotary shaft and engaging with said rear bracket to prevent said armature rotary shaft from moving axially forwardly, a plurality of headed through bolts (8) extending exteriorly, alongside of and closely proximate outer peripheries of said rear bracket and machine frame, and into said front bracket for fastening said rear bracket and said machine frame together to said front bracket, a plurality of supports (20b) formed separately from said rear bracket and individually engaging the heads of said through bolts, and a cover (20a) centrally disposed on the rear end of said rear bracket and overlying said retaining member, wherein said cover is integrally formed with said supports, said supports extend radially outwardly from said cover beyond outermost peripheries of said rear bracket and machine frame, and outermost ends of said supports define planar seats for the heads of said through bolts, perpendicular to a longitudinal axis of said starter motor.

2. A starter motor as claimed in claim 1, wherein said cover and said supports are formed in an integral relationship by stamping an iron plate.

3. A starter motor as claimed in claim 1, wherein each of said supports includes a flat portion (20c) which serves as a planar seat for the head of a corresponding one of said through bolts, and a pair of pawl portions (20d) extending laterally from the opposite side edges of said flat portion along the outer periphery of said rear bracket.

* * * * *